United States Patent [19]

Acampora et al.

[11] Patent Number: 4,638,476
[45] Date of Patent: Jan. 20, 1987

[54] TECHNIQUE FOR DYNAMIC RESOURCE ALLOCATION IN A COMMUNICATION SYSTEM

[75] Inventors: Anthony Acampora, Freehold; Michael J. Gans, Monmouth Beach, both of N.J.

[73] Assignee: AT&T Bell Laboratories, Murray Hill, N.J.

[21] Appl. No.: 747,430

[22] Filed: Jun. 21, 1985

[51] Int. Cl.$^4$ ............................................... H04J 3/16
[52] U.S. Cl. ........................................ 370/83; 370/79; 370/94
[58] Field of Search .............. 370/83, 79, 94, 85; 340/825.5, 825.51

[56] References Cited

U.S. PATENT DOCUMENTS

| | | | |
|---|---|---|---|
| 3,749,842 | 7/1973 | Poretti | 370/83 |
| 3,764,915 | 10/1973 | Cox et al. | 325/53 |
| 3,961,139 | 6/1976 | Bowman et al. | 179/15 |
| 4,229,622 | 10/1980 | Cochrane | 370/81 |
| 4,301,533 | 11/1981 | Acampora et al. | 370/104 |
| 4,309,764 | 1/1982 | Acampora | 370/83 |
| 4,357,700 | 11/1982 | Alvarez, III et al. | 370/79 |
| 4,482,995 | 11/1984 | Binz et al. | 370/59 |
| 4,482,999 | 11/1984 | Janson et al. | 370/86 |
| 4,495,619 | 1/1985 | Acampora et al. | 370/104 |
| 4,593,286 | 6/1986 | Acampora et al. | 340/825.5 |

OTHER PUBLICATIONS

Shiomi et al., Elec. & Comm. Jpn., vol. 55-A, No. 11, Nov. 1972, pp. 26-34.
Tannenbaum, Computer Networks, Prentice Hall, 1981, Section 3.4.3.
Acampora, IEEE Jrnl. Sel. Area In Comm., vol. SAC-1, No. 1, Jan. 1983, pp. 133-142.
Aidarous et al., ICC '83, 6/19-22/1983, Boston, Massachusetts, vol. 1, pp. 574-580.
Jabbari et al., ICC '83, 6/19-22/1983, Boston, Mass., vol. 2, pp. 928-931.

*Primary Examiner*—Douglas W. Olms
*Attorney, Agent, or Firm*—Erwin W. Pfeifle

[57] ABSTRACT

The present invention relates to a dynamic resource allocation technique for multiple users of a channel that employs variable coding and associated redundancy to provide a maximum data rate for various demand conditions while simultaneously providing a maximal margin that is matched to the current demand condition. For such technique, each first data rate input signal is synchronized to a second higher data rate, the synchronized signals are then separately demultiplexed for propagation along separate paths and encoded in a separate variable rate coder (VRC). The output from each VRC is stored in a separate bus interface which contends for a common bus when full. A rate controller maintains the activity on the common bus at a minimum level by either monitoring (1) the activity on the bus, (2) the rate the bus interfaces are filling up, or (3) both (1) and (2) above, and in response thereto to transmit control signal to the VRCs to appropriately vary the codes and redundancy used.

10 Claims, 5 Drawing Figures

TECHNIQUE FOR DYNAMIC RESOURCE ALLOCATION IN A COMMUNICATION SYSTEM

The Government has rights in this invention pursuant to Contract No. F33657-84-C-3716.

TECHNICAL FIELD

The present invention relates to a technique for dynamic resource allocation in a communication system and, more particularly, to a dynamic resource allocation technique for multiple users of a channel that employs coding and redundancy to provide a maximum data rate for all changing traffic conditions while simultaneously providing a link margin which is maximal for the momentary traffic condition.

DESCRIPTION OF THE PRIOR ART

Communication system designers have had to consider problems relating to variable traffic conditions over time and the associated channel capacity to be provided. Additionally, in radio systems, impairments due to, for example, interference or rain outage are also considered. Solutions for one or more of these problems have surfaced in various forms over the years. One such system solution was disclosed in U.S. Pat. No. 3,961,139 issued to R. A. Bowman et al on June 1, 1976, which relates to a TDM loop communication system wherein a plurality of terminals share one or more channels of a multichannel frame while a second plurality of terminals is assigned to different channels. In Bowman et al, a communications controller can dedicate one or more of the channels to one of the terminals automatically and dynamically. Alternatively, one of the plurality of terminals assigned to a particular channel group can interrupt the controller and become automatically selected for communication.

A technique for increasing the rain margin of a multibeam TDMA communication system was disclosed in U.S. Pat. No. 4,301,533 issued to A. Acampora et al on November 17, 1981. In the disclosed TDMA system, a pool of TDMA time slots was used to permit the power normally transmitted in any portion of the multiple concurrent beams to be applied to one beam directed at one ground station to overcome a fade condition at that station. An alternative method for increasing the capacity of digital satellites by the use of resource sharing and coding is disclosed in the article by A. Acampora in *IEEE Journal On Selected Areas in Communications*, Vol. SAC-1, No. 1, January 1983 at pages 133–142. There, during clear-air conditions, coding with a large channel signaling alphabet is used to permit a high rate of information transfer. When the fade depth exceeds a built-in fade margin, the signaling alphabet is reduced and enough time slots are borrowed from a resource sharing reserves time slot pool to maintain the data rate and overcome the fade at the fade site.

The prior art systems appear to provide protection for fading at any terminal in the system by using coding techniques which maintain the link margin at the faded site regardless of the momentary traffic conditions. The extra time slot(s), needed for a change in coding to obtain this extra margin, are obtained by either dropping low priority users or by maintaining a poor of spare time slots. The problem remaining in the prior art is to provide a dynamic resource allocation technique which matches the margin to the data rate or momentary traffic conditions.

SUMMARY OF THE INVENTION

The foregoing problem in the prior art has been solved in accordance with the present invention which relates to a technique for dynamic resource allocation in a communication system and, more particularly, to a dynamic resource allocation technique for multiple users of a channel that employs variable rate coding and associated redundancy to maintain a maximum data rate for all changing user demand cnditions while simultaneously providing a link margin which is maximal for the momentary demand condition.

It is an aspect of the present invention to provide a dynamic resource allocation technique which is useful in sporadic demand conditions for a communication channel. More particularly, long codes are used for transmission because for most of the time the demand only requires a small channel rate. For a small percentage of the time, the demand may be high, in which case the coding is decreased, making the signal more vulnerable to fading. However, unless the fading event occurs simultaneously with the high channel demand, the long codes will provide a much increased fade margin. Thus, the probability of a fade outage is reduced in accordance with the present technique by the requirement that the fade occur at a time of high channel demand.

It is a further aspect of the present invention to provide a communication terminal wherein each input signal, at a first data rate, is synchronized to a faster second data rate signal. Each synchronized output signal is separately demultiplexed into a plurality of subsections thereof for propagation along separate paths to separate variable rate coders (VRC). The variable rate coders are each responsive to control signals from a rate controller for encoding the received demultiplexed signal using the code, and associating redundancy, indicated by such control signals. The encoded signals from each VRC are stored in a separate bus interface which, when full, contends for time on a common bus. The rate controller can monitor either one or both of (1) the date rate on the common bus and (2) the rate the bus interfaces are filling up, to either speed up or slow down the coding rate used by the various VRCs. Therefore, the present technique functions to maintain a maximum output data rate for various demand conditions while simultaneously providing a maximum link margin that is matched to that data rate, which margin may or may not be sufficient to overcome a particular momentary fade condition.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
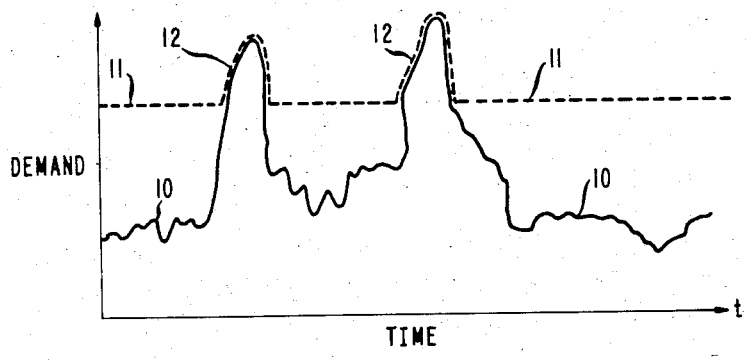
FIG. 1 is an exemplary curve for the demand for a channel versus time in a multiple user communication system.

The present invention relates to a technique for dynamic resource allocation in a communication system wherein multiple input signals contend for a common channel. FIG. 1 illustrates an exemplary curve 10 of demand versus time for a typical communication system for illustrating a concept of the present invention. In accordance with the present invention, the multiple input signals are separately coded, using a particular one of a multiple of separate codes with predetermined redundancies at any instant of time, which code can be changed to maintain a predetermined overall output data rate indicative of a constant demand as shown by dashed line 11 in FIG. 1. The individual redundancy codes used for encoding the multiple signals to be transmitted, while providing an overall maximum data rate at the output of the transmitter, also provide a maximal margin for the particular momentary demand condition to aid in overcoming fades at the receivers. In the areas 12 above line 11 in the curve of FIG. 1 where the demand is high, no or very little coding or margin would be provided in order meet the demand and provide a maximum data rate transmission. Therefore, the prime objective in accordance with the present invention is to provide a maximum data transmission rate while still providing a maximum margin for each demand condition, which margin may, or may not, be sufficient to overcome a particular fade condition at a receiver.

Figure 2:
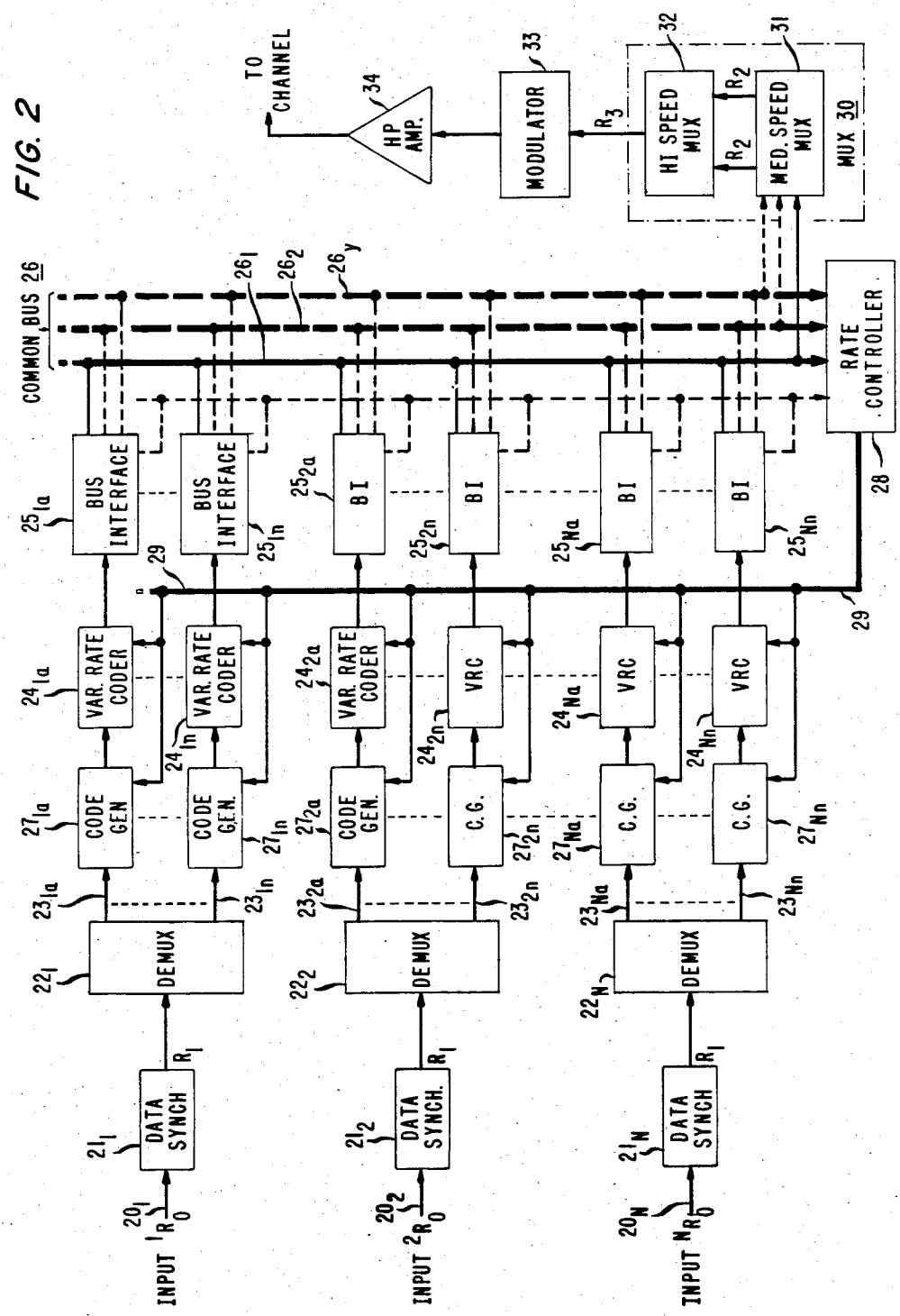
FIG. 2 is a block diagram of a exemplary terminal of a communication system for implementing the dynamic resource allocation technique in accordance with the present invention.

FIG. 2 illustrates a preferred embodiment of a transmitter in accordance with the present invention for implementing the above-described concept. In FIG. 2, a plurality of N input signals at a predetermined data rate, as, for example, rate $R_0$, are received over separate lines $20_1$ to $20_N$. The description which follows relates to the processing of the input signal on lead $20_1$ and it is to be understood that the other possible input signals received on leads $20_2$ to $20_N$ are processed in the same manner using corresponding devices.

The input signal on lead $20_1$ is received in a data synchronizing means $21_1$ which functions to synchronize the input signal at the $R_0$ data rate to an output signal at some faster predetermined $R_1$ data rate. It is to be understood that $R_1 = XR_0$ where $X > 1$. The output signal from data synchronizing means $21_1$ is received by a demultiplexing means $22_1$ where the synchronized input signal is separated in a predetermined manner into one or more output signals which propagate along separate lines $23_{1a}$ to $23_{1n}$. More particularly, if it is assumed, for example, that the input signal is a digital NTSC television signal, then demultiplexing means could function, for example, to transmit the luminance Y and the chrominance I and Q signals over separate lines $23_{1a}$–$23_{1c}$, respectively. It is to be understood that similar other subdivisions of a television signal as, for example, line signals, or other non-television input signals could be appropriately demultiplexed by demultiplexing means 22.

Each output signal from demultiplexing means $22_1$ on the lines $23_{1a}$–$23_{1n}$ is transmitted to a separate variable rate coding (VRC) means $24_{1a}$–$24_{1n}$, respectively, via a respective code generator $27_{1a}$–$27_{1n}$. Each VRC means 24 is responsive to a control signal from a rate controller 28, transmitted via a control signal bus 29, to encode the input signal using a corresponding code with a predetermined redundancy. Concurrently, each associated code generator $27_{ij}$ is also responsive to the control signals from rate controller 28 to generate a code control signal for transmission in the transmitted signal to the remote receiver indicative of the code used by the associated VRC $24_{ij}$. It is to be understood that a code generator 27 can comprise a means which, for example, uses a look-up table format to match a control signal from rate controller 28 to the appropriate code control signal to be sent. It is to further understood that such code control signal could form part of, for example, the preamble of the associated information signal.

The output from each of VRC means $24_{1a}$ to $24_{1n}$ is transmitted to a separate one of Bus Interface (BI) units $25_{1a}$–$25_{1n}$, respectively. BI units 25 each function to assemble and store the encoded output information signals from the associated VRC 24 into packets of information for subsequent transmission. When the storage means of a BI unit 25 is full, it contends for transmission of its stored packer of information over a common bus 26 associated with the BI unit 25.

Common Bus 26 can comprise one or more buses designated as $26_1$–$26_Y$ in FIG. 2. If only one bus is provided as, for example, bus $26_1$, which is shown as a solid line since it is always required, then all BI units 25 will have their output connected to this bus. If, however, more than one common bus is provided as, for example, where Y=3, then each BI unit 25 can be connected to all three buses, as shown, or BI units 25 can be groups as desired for connection to a different one or to more than one of the common buses 26. Again, each of the grouped BI units 25 will contend for time on the associated bus or buses with all the other associated BI units 25 in the same group. It is to be understood that common bus 26 can comprise the form of a straight bus or that of a loop.

Figure 3:
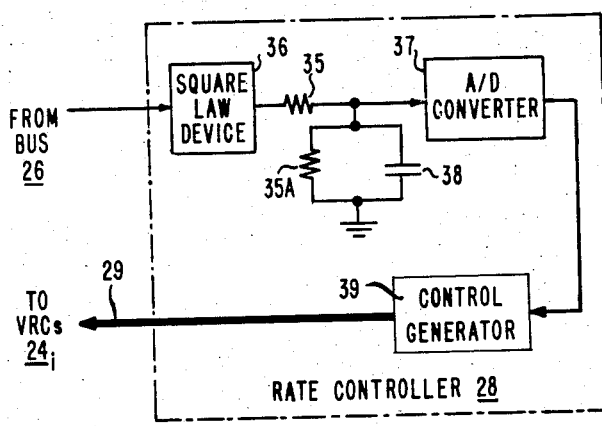
FIG. 3 is a block diagram of an exemplary rate controller for use in the arrangement of FIG. 2.

Connected to receive the information propagating on common bus 26 is a rate controller 28 and a multiplexing means 30. Rate controller 28 functions to try to maintain the activity on common bus 26 at 100%, or as close thereto as possible, by varying the coding of VRCs 24. To achieve this function, rate controller 28 can either (1) monitor the data rate on each of buses $26_i$, (2) monitor the data rate at which encoded information is filling up the storage devices of BI units 25 associated with each bus, or (3) a combination of (1) and (2) above. To monitor the traffic on a bus as suggested in (1) above, where, for example, the information is sent as digital "1"s and "0"s, rate controller 28 can a comprise a detector such as an average voltage detector which measures, for example, how many digital "1"s are propagating on the associated bus over a given period of time. Alternatively, if signals are sent, for example, via "0"s, "+1"s and "−1"s, then rate controller 28 can comprise a square law device 36 with an integrating combination of a resistor 35 and a shunt-to-ground comprising a parallel resistor 35a and capacitor 38 followed by an A/D converter 37, as shown in FIG. 3, to measure the traffic on a bus. More particularly, the +1 and −1 signals would add a voltage increment to capacitor 38 from square law device 36 and a digital "0" would subtract a predetermined voltage increment from the capacitor 38 by a discharge through resistor 35a. The resultant voltage level from capacitor 38 would be converted to digital representation by an A/D converter 37 to represent the traffic on the bus in digital form. A control generator 39, responsive to the resultant output signal from A/D converter 37, can, by comparing to internally preset thresholds, provide appropriate control signals to VRCs 24 via control signal bus 29 to cause the individual VRCs to adopt the appropriate coding.

In FIG. 2, a multiplexing means 30 is used to multiplex signals from common bus 26 under conditions where more than one bus $26_i$ forms common bus 26. This multiplexing function can be accomplished in one or more steps depending on the number of buses $26_i$ to be multiplexed and the data rate desired at the output of multiplexing means 30. A two-step multiplexing means is shown in FIG. 2. There, the output from the three exemplary buses $26_1$, $26_2$ and $26_Y$, where $Y=3$, are first multiplexed in a medium speed multiplexer 31 to change the $R_1$ rate found on each bus $26_i$ into separate output signals comprising a higher data rate $R_2$ on each of, for example, two lines. The output signals on the exemplary two lines from multiplexer 31 are received in a high-speed multiplexer 32 which functions to multiplex the two input signals at the $R_2$ rate into a single output signals at a still higher $R_3$ rate. It is to be understood that a single multiplexer can be used in multiplexing means 30 where possible. The single output signal from high-speed multiplexer 32 is modulated to the appropriate channel frequency in modulator 33 and amplified to the proper level in high-power amplifier 34 for transmission over the channel.

Figure 4:
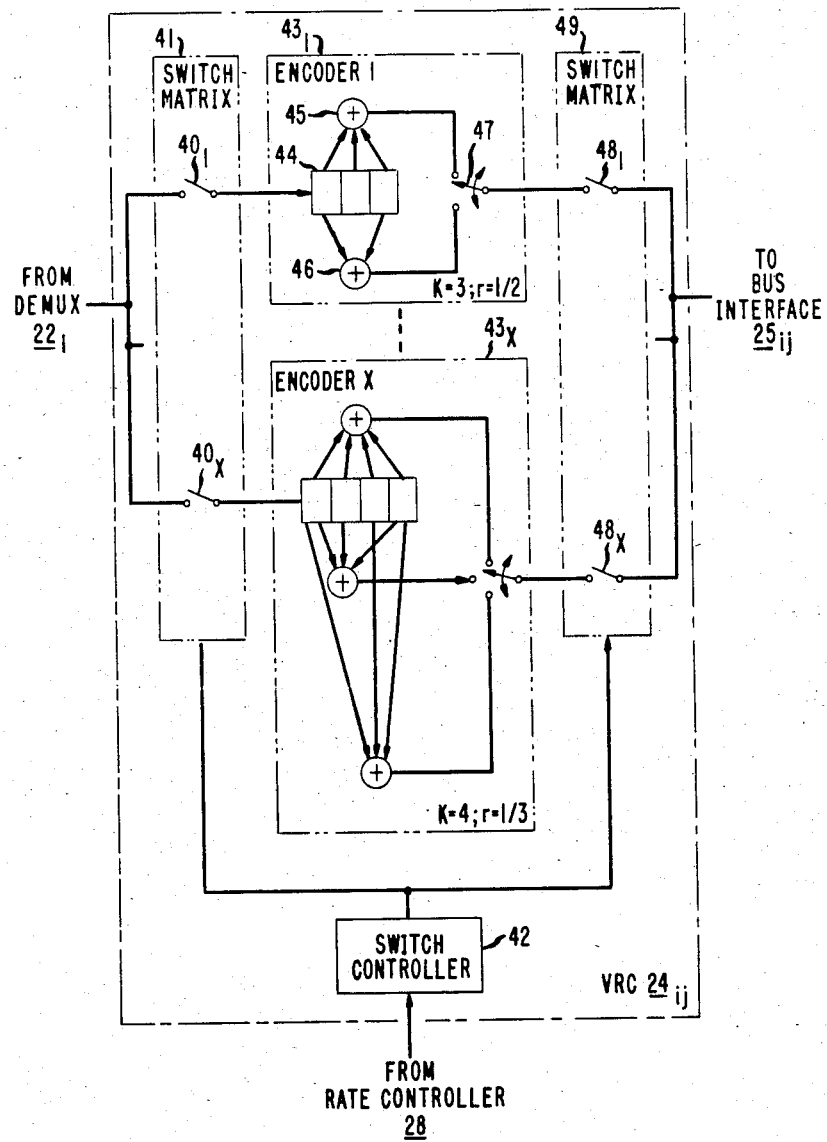
FIG. 4 is a block diagram of an exemplary variable rate coder for use in the arrangement of FIG. 2.

FIG. 4 illustrates an exemplary arrangement for a VRC $24_{ij}$ which uses various convolutional codes, and associated redundancies, in response to control signals from rate controller 28. In the exemplary arrangement of FIG. 4, the digital signal from the associated demultiplexing means $22_i$ is provided as an input to each of a plurality of X switching means $40_1$–$40_X$ forming a first switching matrix 41. Switching means $40_1$–$40_X$ are responsive to switching control signals from a switch controller 42 to selectively close, at any instant of time, a desired one of the switching means $40_i$ to permit the input digital signal to be transmitted through the selected switching means to an associated separate one of a plurality of X encoders $43_1$–$43_X$. Switch controller 42 functions to close the proper switching means $40_i$ in response to control signals from rate controller 28 in order to direct the input signal to the proper predetermined redundancy encoder $43_i$. More particularly, the closure of switching means $40_1$ directs the input signal to an encoder $43_1$ while the closure of switching means $40_X$ directs the input signal to an encoder $43_X$, each of which use a different code and associated redundancy.

The arrangement shown for encoder $43_1$ is a convolutional encoder which provides a constraint length $K=3$, $r=\frac{1}{2}$ code while the arrangement for encoder $43_X$ provides a constraint length $K=4$, $r=\frac{1}{3}$ code. These arrangements are well known in the art and are shown for exemplary purposes only since any other known arrangement could be used for providing the necessary encoding and the maximum data throughput for different traffic conditions. In encoder $43_1$, digital data at the input is serially shifted through a three-bit shift register 44. Between shifts, modulo-2 adders 45 and 46 operate on all the stored bits and the first and third bits, respectively, to produce separate output signals. A commutator 47 cyclically selects the output from adder 45 and then the output from adder 46 for transmission to the input of second switching means $48_1$ which is part of a plurality of X second switching means $48_1$–$48_X$ forming a second switching matrix 49. Encoder $43_X$ operates in a similar manner on digital data which is gated through first switching means $40_X$ using an appropriate length shift register and three modulo-2 adders to provide the $K=4$, $r=\frac{1}{3}$ code. Switch controller 42 also functions to close, concurrent with the closure of the selected first switching means $40_i$, the corresponding one of the second switching means $48_i$ so that data selectively switched to a particular encoder $43_i$ has the resultant encoded output signal delivered to the output of the associated VRC $24_{ij}$.

Figure 5:
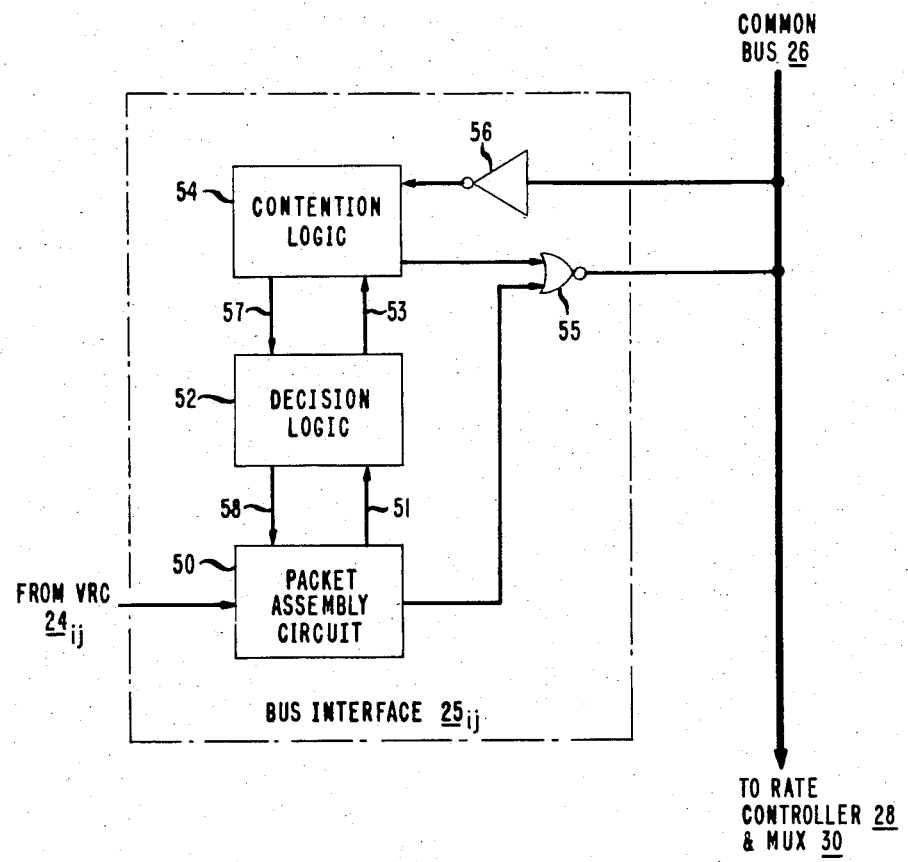
FIG. 5 is a block diagram of an exemplary bus interface unit for use in the arrangement of FIG. 2.

Bus Interface unit $25_{ij}$ can comprise any suitable arrangement. An exemplary arrangement for such BI unit, which interconnects digital signals from an associated VRC $24_{ij}$ to a common bus 26, is shown in FIG. 5. One major function served by a BI unit is contention resolution for accessing time slots on a common bus 26. Another BI unit 25 function is the assembly of packets of information which include, for example, header information and data originating from a particular source for insertion in a time slot on common bus 26. Assembly of a packet of information from associated VRC $24_{ij}$ is performed in a packet assembly circuit 50. Such assembly, and possibly disassembly where the transmitting and receiving function are at a same location, is required in all packet-switching network architectures, and has been described extensively in the literature. A summary of the assembly operation performed in circuit 50, the details of which form no part of the present invention, is contained in A. S. Tanenbaum, *Computer Networks*, Prentice Hall, 1981, Section 3.4.3. Examples of packet assembler circuits can be found in commercially available systems known as DECNET (by Digital Equipment Corp.), SNA (by IBM Corp.), Ethernet (by Xerox Corp.), LocalNet (by Sytek Corp.) and Net/One (by Ungermann-Bass), the last three systems being local area networks.

When a packet has been assembled, circuit 50 couples a packet ready indication, via line 51, to a decision logic circuit 52, indicating that a time slot for transmitting the packet of information in common bus 26 is desired. Concurrently, information describing the type of communication desired (e.g., asynchronous or synchronous) is also applied from circuit 50 to decision logic 52 if such protocol forms a part of the system. Depending upon the particular protocol selected, decision logic 52, which may be a finite state logic machine, then couples a control signal via lines 53 to a contention logic circuit 54 indicating an appropriate priority code, if used, to be prefixed to the unique contention information (e.g., module number) resident within logic 54 that distinguishes unit $25_{ij}$ from other Bus Interface units connected to common bus 26.

At the beginning of the next time slot on an associated bus $26_i$, the priority bits and the remaining contention information that comprise a priority word are coupled to common bus 26 via a NOR gate 55, one bit at a time, with, for example, the most significant bit first. Bus 26 effectively acts as an OR gate, so that for negative logic, the bus is voltage low when the output of any connected Bus Interface Unit is low. The bus state is monitored by contention logic 54 via an input received via inverter 56. Contention logic 54 is arranged such that a difference between the applied priority word and the received convention information results in a termination of the attempt to access a current time slot. On the other hand, successful access is indicated when the entire priority word applied via gate 55 is identical to the information received by contention logic 54 via inverter 56.

When access to a time slot has been obtained, contention logic 54 signals decision logic 52 and packet assembly circuit 50 via lines 57 and 58 so that a packet assembled in circuit 50 may enter the acquired time slot via NOR gate 55. If succeeding packets from the associated VRC $24_{ij}$ are part of a same synchronous message, they likewise are assembled in circuit 50 and applied to common bus 26 via gate 55. However, for these packets, decision logic 52 can be arranged to insert the appropriate, but different, priority code, in accordance with a selected protocol, so that contention logic 54 will be assured of gaining access to slots needed for synchronous communication. When all the packets in a message have been processed, an end of message signal is extended from packet assembly circuit 50 to decision logic 52 via line 51. It is to be understood that the above description of BI unit 25 is for purposes of exposition only and that any other arrangement can be used that will provide access to a free time slot on common bus 26.

From the A. Acampora article in the *IEEE Journal On Selected Areas in Communication*, Vol. SAC-1, No. 1, January 1983 at pages 133-142, it is known that it is possible to reduce the channel rate by increasing the redundancy of a code which is used and thereby avoid errors during fading or period of high interference. Sometimes the fading situation can be detected and a telemetry control signal used from a faded receiver to adjust to the proper code and channel rate and overcome such fading or interference. When the demand on a channel is sporadic, however, another strategy is used in accordance with the present invention as described hereinbefore which does not require telemetry control signals to a remote station and still combats fading as much as possible. Normally long codes are used for transmission because the demand only requires a small channel rate. For a small percentage of the time, the demand may be high, in which case the coding is decreased, making the signal more vulnerable to fading. However, unless the fading even occurs simultaneously with the high channel demand, the long codes will provide a much increased fade margin. Thus the probability of a fade outage is reduced by the requirement that the fade occur at a time of high demand.

It is to be understood that the above-described embodiments are simply illustrative of the principles of the present invention. Various other modifications and changes may be made by those skilled in the art which will embody the principles of the invention and fall within the spirit and scope thereof. For example, code generators $27_{ij}$ could be eliminated if it were desirous to transmit an indication of a code used by each VRC $24_{ij}$ via a separate telemetry signal or in a separate packet rather than with the individual associated packet of information. Additionally, as was stated previously, multiplexer 30 could be eliminated if only one bus $26_i$ is used, or only a single high-speed multiplexer could be used for multiple buses $26_i$-$26_Y$ where the difference between the bus and channel rate are not too large for one multiplexer to handle.

What is claimed is:

1. A transmitter for a communication system comprising:
   a plurality of coding means, each encoding means being disposed to receive a separate input signal and for encoding the input signal into an encoded output signal using a predetermined one of a plurality of codes with different redundancies at any instant of time in response to a separate control signal;
   a common bus comprising one or more buses;
   a plurality of bus interface (BI) units, each BI unit being disposed to receive the encoded output signal from a separate one of the plurality of encoding means and for assembling the received encoded signal into packers of information for insertion in a next free time slot on a bus of the common bus associated with the BI unit; and
   control means responsive to data propagating within the transmitter for generating control signals to predetermined ones of the plurality of encoding means for changing the codes used and the data rate of the encoded output signal to maintain the data propagating on each bus at a predetermined maximum threshold level while providing a predetermined amount of margin for overcoming fading or interference at a remote receiver.

2. A transmitter according to claim 1, the transmitter further comprising:
   a plurality of demultiplexing means, each demultiplexing means being capable of demultiplexing a separate input signal into one or more output signals for propagation along separate paths to separate ones of the plurality of coding means.

3. A transmitter according to claim 1 or 2 wherein the control means is responsive to instances when data traffic within the transmitter exceeds a predetermined threshold for generating control signals to certain ones of the coding means for causing the certain ones of the coding means to transmit the associated input signal as is without any coding or redundancy.

4. A transmitter according to claim 3 wherein the control means is responsive to the data traffic within the transmitter by monitoring the data propagating on each bus of the common bus.

5. A transmitter according to claim 3 wherein the control means is responsive to the data traffic within the transmitter by monitoring the rate at which the packers of information are assembled within each bus interface unit.

6. A transmitter according to claim 3 wherein the control means is responsive to the data traffic within the transmitter by concurrently monitoring the data propagating on each bus of the common bus and the rate at which the packets of information are formed in each bus interface unit.

7. A transmitter according to claim 3 wherein the control means is responsive to instances when data propagating on the buses of the common bus exceed the predetermined maximum threshold for generating control signals to certain ones of the coding means for causing the certain ones of the coding means to transmit the input signal as is without any coding or redundancy.

8. A transmitter according to claim 1 or 2, the transmitter further comprising:
   plurality of code generating means, each code generating means being disposed in a same path with an associated coding means for generating code information signals for insertion in each packet of information indicative of the code used by the associated coding means.

9. A transmitter according to claim 1 or 2 wherein the common bus includes more than one bus; and the plurality of bus interface units are subdivided into one or more groups of bus interface units, where each group of bus interface units is connected to a same one of more of the buses of the common bus.

10. A transmitter according to claim 3 wherein the common bus includes more than one bus; and
the plurality of bus interface units are subdivided into one or more groups of bus interface units, where each group of bus interface units is connected to a same one or more of the buses of the common bus.

* * * * *

UNITED STATES PATENT AND TRADEMARK OFFICE
CERTIFICATE OF CORRECTION

PATENT NO. : 4,638,476

DATED : January 20, 1987

INVENTOR(S) : Anthony Acampora and Michael J. Gans

It is certified that error appears in the above-identified patent and that said Letters Patent is hereby corrected as shown below:

In Claim 1, Column 8, line 8, "packers" should read --packets--.

In Claim 5, Column 8, line 43, "packers" should read --packets--.

In Claim 9, Column 9, line 4, "of" first occurrence should read --or--.

Signed and Sealed this

Nineteenth Day of January, 1988

Attest:

DONALD J. QUIGG

*Attesting Officer*   *Commissioner of Patents and Trademarks*